(12) United States Patent
Chen et al.

(10) Patent No.: US 12,043,785 B2
(45) Date of Patent: Jul. 23, 2024

(54) ABRASIVE ARTICLES INCLUDING CONFORMABLE COATINGS AND POLISHING SYSTEM THEREFROM

(71) Applicant: 3M INNOVATIVE PROPERTIES COMPANY, St. Paul, MN (US)

(72) Inventors: Chi-Fan Chen, Taichung (TW); Caleb T. Nelson, Woodbury, MN (US); Moses M. David, Wells, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 709 days.

(21) Appl. No.: 16/629,769

(22) PCT Filed: Jul. 5, 2018

(86) PCT No.: PCT/IB2018/054978
§ 371 (c)(1),
(2) Date: Jan. 9, 2020

(87) PCT Pub. No.: WO2019/012389
PCT Pub. Date: Jan. 17, 2019

(65) Prior Publication Data
US 2020/0172780 A1    Jun. 4, 2020

Related U.S. Application Data

(60) Provisional application No. 62/530,976, filed on Jul. 11, 2017.

(51) Int. Cl.
*C09K 3/14* (2006.01)
*B24B 53/12* (2006.01)
*B24D 11/00* (2006.01)

(52) U.S. Cl.
CPC ............ *C09K 3/1436* (2013.01); *B24B 53/12* (2013.01); *B24D 11/001* (2013.01)

(58) Field of Classification Search
CPC ......... B24B 37/24; B24B 53/02; B24B 53/12; B24B 37/22; B24B 37/26; B24D 11/001; B24D 3/14; C09K 3/1436
See application file for complete search history.

(56) References Cited

U.S. PATENT DOCUMENTS 5,152,917 A    10/1992  Pieper
5,352,493 A    10/1994  Dorfman
(Continued)

FOREIGN PATENT DOCUMENTS

EP    1464444 A1    10/2004
TW    201538272 A    10/2015
(Continued)

OTHER PUBLICATIONS

Kwon, "SAM Modification of CMP Conditioner for the Prevention of Particle Adhesion", ECS Transaction, 2009, vol. 25, No. 05, pp. 95-99.
(Continued)

*Primary Examiner* — Shuangyi Abu Ali
(74) *Attorney, Agent, or Firm* — Jonathan L. Tolstedt

(57) ABSTRACT

The present disclosure relates to abrasive articles including conformable coatings, e.g. a hydrophobic coating, methods of making and polishing systems therefrom. The present disclosure provides an abrasive layer, having a hydrophobic exterior surface, including at least one of (i) a plurality of individual diamond particles and (ii) a plurality of engineered features having a conformable diamond layer and; a conformable hydrophobic layer in contact with and at least partially coating at least one of the plurality of individual diamond particles and the conformable diamond layer and, wherein the conformable hydrophobic layer includes dia-
(Continued)

mond like glass and forms the hydrophobic exterior surface and the contact angle of the hydrophobic exterior surface is greater than 110 degrees.

13 Claims, 3 Drawing Sheets

(56) References Cited

U.S. PATENT DOCUMENTS

| | | | |
|---|---|---|---|
| 5,435,816 | A | 7/1995 | Spurgeon |
| 5,921,856 | A | 7/1999 | Zimmer |
| 6,021,559 | A | 2/2000 | Smith |
| 6,076,248 | A | 6/2000 | Hoopman |
| 6,123,612 | A | 9/2000 | Goers |
| 6,368,198 | B1 | 4/2002 | Sung |
| 6,468,642 | B1 | 10/2002 | Bray |
| 6,696,157 | B1* | 2/2004 | David ................. C09K 11/025 428/408 |
| 7,160,178 | B2 | 1/2007 | Gagliardi |
| 8,905,823 | B2 | 12/2014 | Wu |
| 2008/0193649 | A1 | 8/2008 | Jacquet |
| 2009/0224370 | A1 | 9/2009 | Slutz |
| 2010/0330886 | A1* | 12/2010 | Wu ..................... B24B 53/017 51/307 |
| 2011/0053479 | A1 | 3/2011 | Kim |
| 2012/0122377 | A1 | 5/2012 | Wu et al. |
| 2015/0087212 | A1 | 3/2015 | Doering |
| 2015/0224625 | A1* | 8/2015 | Lehuu ................... B24D 18/00 451/442 |
| 2016/0016292 | A1 | 1/2016 | Doi et al. |
| 2017/0008143 | A1* | 1/2017 | Minami ................. B24B 37/26 |

FOREIGN PATENT DOCUMENTS

| | | |
|---|---|---|
| WO | 0166820 A1 | 9/2001 |
| WO | 2010141464 A2 | 12/2010 |
| WO | 2014022465 A1 | 2/2014 |
| WO | WO 2014-022462 | 2/2014 |
| WO | WO 2015-112540 | 7/2015 |
| WO | 2015153601 A1 | 10/2015 |
| WO | WO 2015-164468 | 10/2015 |
| WO | WO 2019-012388 | 1/2019 |
| WO | WO 2019-012391 | 1/2019 |

OTHER PUBLICATIONS

Clint, "Adhesion Under Water: Surface Energy Considerations", International Journal of Adhesion & Adhesives, 2001, vol. 21, pp. 267-273.
Yang, "Wettability of Plasma-Treated Nanocrystalline Diamond Films", Diamond & Related Materials, 2012, vol. 24, pp. 54-58.
Kobayashi, "Wettability and Antifouling Behavior on The Surfaces of Superhydrophilic Polymer Brushes", American Chemical Society, Langmuir, 2012, vol. 28, pp. 7212-7222.
International Search Report for PCT International Application No. PCT/IB2018/054978, mailed on Nov. 14, 2018, 2 pages.

* cited by examiner

ABRASIVE ARTICLES INCLUDING CONFORMABLE COATINGS AND POLISHING SYSTEM THEREFROM

CROSS REFERENCE TO RELATED APPLICATIONS

This application is a national stage filing under 35 U.S.C. 371 of PCT/IB2018/054978, filed Jul. 5, 2018, which claims the benefit of U.S. Provisional Application No. 62/530,976, filed Jul. 11, 2017, the disclosure of which is incorporated by reference in its/their entirety herein.

TECHNICAL FIELD

The present disclosure relates to abrasive articles having conformable coatings, for example pad conditioners having conformable coatings, methods of making and polishing systems therefrom.

BACKGROUND

Abrasive articles having a coating have been described in, for example, U.S. Pat. Nos. 5,921,856; 6,368,198 and 8,905,823 and U.S. Pat. Publ. Nos. 2011/0053479 and 2017/0008143.

SUMMARY

Abrasive articles are typically used to abrade various substrates, in order to remove a portion of the abraded substrate surface from the substrate itself. Abrasive articles which include diamond as the abrading material, e.g. discrete diamond particles or a diamond coating or layer, are often preferred, due to diamond's unique properties, including its high hardness and chemical resistance. However, in some applications the diamond particles or diamond coating can fracture, releasing diamond fragments which become free to scratch the substrate being polished. For example, diamond abrasive based pad conditioners are often used in chemical mechanical planarization (CMP) applications. In chemical mechanical planarization applications, a polishing system may include a polishing pad, often a polymeric based material, e.g. polyurethane; an abrasive article designed to abrade the pad, e.g. a diamond abrasive based pad conditioner; a substrate being polished, e.g. a semiconductor wafer; and a working liquid, e.g. a polishing slurry containing abrasive particles, designed to polish/abrade the substrate being polished. The diamond abrasive based pad conditioners are typically used to abrade the polishing pad in order to remove the glaze and/or expose new polishing pad surface, thereby maintaining consistent polishing performance of the pad over long periods of polishing time. The polishing pad itself, along with a working liquid, e.g. a slurry, is used to polish a surface of a substrate, e.g. a semiconductor wafer. Wafer defects, such as scratching, are known to reduce the yield from a given wafer and need to be avoided. However, sometimes during use, diamond from the pad conditioner fractures and releases small shards of diamond into the polishing system. These shards, which may also be called fragments, may get embedded in the polishing pad and make contact with the substrate, e.g. semiconductor wafer, causing detrimental scratches that subsequently reduce wafer yield. What is needed is a pad conditioner that can reduce and/or eliminate the detrimental effect of abrasive fragments in, for example CMP polishing systems. In this regards, an abrasive article with diamond abrasive has been developed which includes a unique hydrophobic coating, i.e. hydrophobic layer. The hydrophobic coating enable diamond fragments that may be released from the abrasive article to float or be suspended in, for example, the aqueous based slurry of the polishing system. Thus, instead of settling on the polishing pad and being embedded in the pad, where it can cause wafer defects, the diamond fragments can flow off the pad, as excess slurry flows off the pad during polishing, or be rinsed off the pad during a pad cleaning step, where a cleaning liquid, e.g. water, is used to rinse the pad.

The present disclosure relates to abrasive articles having a unique hydrophobic exterior surface. The hydrophobic exterior surface enhances the ability of abrasive fragments, e.g. diamond fragments, to float or be suspended in a liquid and facilitates their ability to be removed from the polishing system, leading to lower defects in the substrate being polished or abraded. The present disclosure also provides methods of making the abrasive articles of the present disclosure.

In one embodiment, the present disclosure provides and abrasive article comprising: an abrasive layer, having a hydrophobic exterior surface, including at least one of (i) a plurality of individual diamond particles and (ii) a plurality of engineered features having a conformable diamond layer and; a conformable hydrophobic layer in contact with and at least partially coating at least one of the plurality of individual diamond particles and the conformable diamond layer and, wherein the conformable hydrophobic layer includes diamond like glass and forms the hydrophobic exterior surface and the contact angle of the hydrophobic exterior surface is greater than 110 degrees. The conformable diamond layer may include at least one of diamond like carbon, microcrystalline diamond and nanocrystalline diamond.

In another embodiment, the present disclosure provides a method of making an abrasive article comprising:
providing an abrasive layer having a surface, wherein the surface includes a plurality of engineered features having a conformable diamond layer; and
depositing a conformable hydrophobic layer in contact with and at least partially coating the conformable diamond layer, thereby forming an abrasive layer having a hydrophobic exterior surface; and wherein the conformable hydrophobic layer includes diamond like glass and the contact angle of the hydrophobic exterior surface is greater than 110 degrees.

In yet another embodiment the present disclosure provides a method of making an abrasive article comprising:
providing an abrasive layer having a surface, wherein the surface includes a plurality of individual diamond particles; and
depositing a conformable hydrophobic layer in contact with and at least partially coating the plurality of individual diamond particles, thereby forming an abrasive layer having a hydrophobic exterior surface; and wherein the hydrophobic layer includes diamond like glass and the contact angle of the hydrophobic exterior surface is greater than 110 degrees.

In another embodiment the present disclosure provides a polishing system comprising:
a polishing pad including a material;
a pad conditioner having an abrasive layer, wherein the pad conditioner includes at least one abrasive article according to the present disclosure.

Figure 1A:
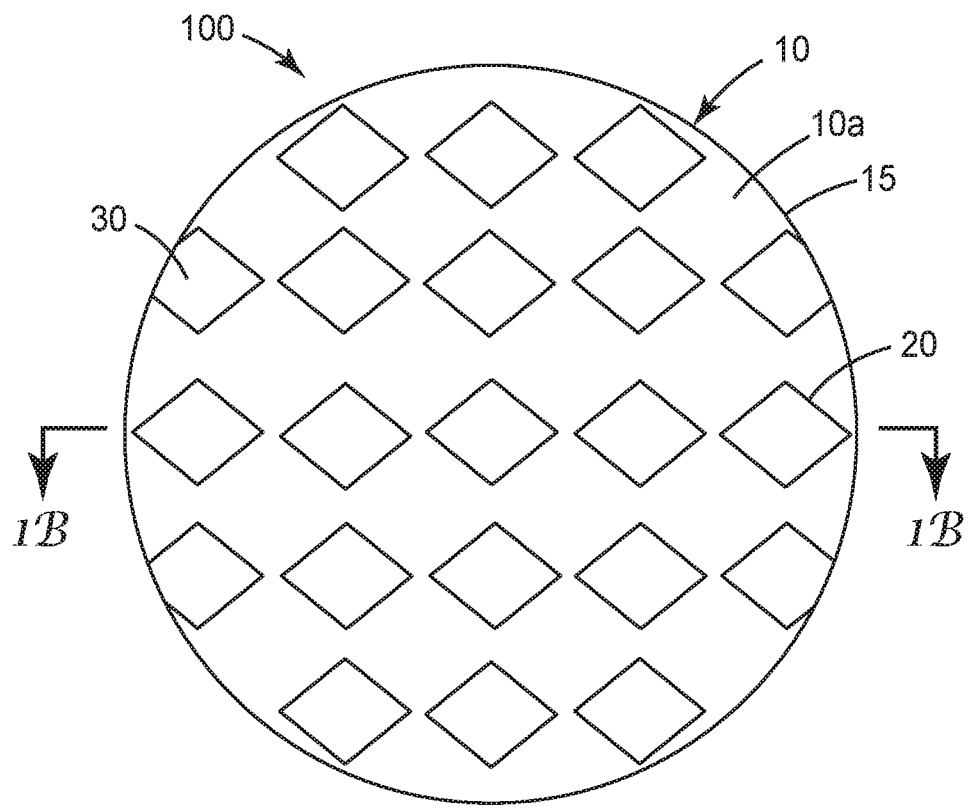
FIG. 1A is a schematic top view of at least a portion of an exemplary abrasive article according to one exemplary embodiment of the present disclosure.

Repeated use of reference characters in the specification and drawings is intended to represent the same or analogous features or elements of the disclosure. The drawings may not be drawn to scale. As used herein, the word "between", as applied to numerical ranges, includes the endpoints of the ranges, unless otherwise specified. The recitation of numerical ranges by endpoints includes all numbers within that range (e.g. 1 to 5 includes 1, 1.5, 2, 2.75, 3, 3.80, 4, and 5) and any range within that range.

It should be understood that numerous other modifications and embodiments can be devised by those skilled in the art, which fall within the scope and spirit of the principles of the disclosure. All scientific and technical terms used herein have meanings commonly used in the art unless otherwise specified. The definitions provided herein are to facilitate understanding of certain terms used frequently herein and are not meant to limit the scope of the present disclosure. As used in this specification and the appended claims, the singular forms "a", "an", and "the" encompass embodiments having plural referents, unless the context clearly dictates otherwise. As used in this specification and the appended claims, the term "or" is generally employed in its sense including "and/or" unless the context clearly dictates otherwise.

Throughout this disclosure, "engineered features" refers to three-dimensional features (topographical features having a length, width and height) having a machined shape, i.e. cutting to form the shape, or molded shape, the molded shape of the engineered features being the inverse shape of a corresponding mold cavities, said shape being retained after the three-dimensional features are removed from the mold cavities. The engineered features, may shrink in dimensions, due to, for example, sintering of a green body ceramic to form ceramic engineered features. However, the shrunken, three-dimensional features still maintain the general shape of the mold cavity that the green body was formed from and are still considered engineered features.

Throughout this disclosure, "micro-replication" refers to a fabrication technique wherein precisely shaped topographical features are prepared by casting or molding a polymer (or polymer precursor that is later cured to form a polymer) or ceramic powder precursor in a production tool, e.g. a mold or embossing tool, wherein the production tool has a plurality of micron sized to millimeter sized topographical features that are the inverse shape of the final desired features. Upon removing the polymer or ceramic powder precursor from the production tool, a series of topographical features are present in the surface of the polymer or green body ceramic. The topographical features of the polymer surface and green body ceramic surface have the inverse shape as the features of the original production tool.

Throughout this disclosure the phrase "conformable layer", e.g. conformable diamond layer and conformable hydrophobic layer, refers to a layer that conforms to the topography of the at least one of a plurality of individual diamond particles and a plurality of engineered features. The layer conforms to the surface topography or a surface's topography, in general, and does not completely fill in the surface topography to produce a planar surface, e.g. the coating does not planarize the plurality of engineered features of the abrasive layer nor does it planarize the plurality of individual diamond particles of the abrasive layer.

DETAILED DESCRIPTION

The present disclosure relates to abrasive articles useful in a variety of abrading applications. The abrasive articles of the present disclosure show particular utility as pad conditioners or elements of segmented pad conditioners and may be used in a variety of CMP applications. The abrasive articles of the present disclosure have a unique hydrophobic coating which enables one or more fragments of diamond abrasive particulate that may be generated during use to float or be suspended in a working liquid and be washed away from the polishing substrate. This in turn may reduce substrate defects. The hydrophobic surface is the result of one or more coatings, i.e. layers, applied to the abrading layer of the abrasive article. The hydrophobic surface may include diamond like glass applied adjacent to and/or in contact with the at least one of the plurality of individual diamond particles and the plurality of engineered features having a conformable diamond layer. The hydrophobic surface may, generally, be the exterior surface of the abrasive article.

The abrasive articles of the present disclosure include an abrasive layer, having a hydrophobic exterior surface, including at least one of (i) a plurality of individual diamond particles and (ii) a plurality of engineered features having a conformable diamond layer and; a conformable hydrophobic layer in contact with and at least partially coating at least one of the plurality of individual diamond particles and the conformable diamond layer and, wherein the conformable hydrophobic layer includes diamond like glass and forms the hydrophobic exterior surface and the contact angle of the hydrophobic exterior surface is greater than 110 degrees. In some embodiments, the abrasive layer, which includes a hydrophobic exterior surface, includes a plurality of engineered features having a conformable diamond layer. In some embodiments, the abrasive layer, having a hydrophobic exterior surface, includes only a plurality of engineered features having a conformable diamond layer. In some embodiments, the abrasive layer, having a hydrophobic exterior surface, includes a plurality of individual diamond particles. In some embodiments, the abrasive layer, having a hydrophobic exterior surface, includes only a plurality of individual diamond particles. The plurality of individual diamond particles may have an average particle size from 5 microns to 400 microns. In some embodiments, the conformable diamond layer includes at least one of diamond like carbon, microcrystalline diamond and nanocrystalline diamond. The conformable hydrophobic layer may be a conformable coating, conforming to any topography on the abrasive layer, e.g. the plurality of individual diamond particles and/or the plurality of engineered features, including the conformable diamond layer, if present. The diamond like glass of the hydrophobic layer may include carbon, oxygen and silicon. In some embodiments, the amount of oxygen is from 25 mole percent to 35 mole percent, based on the total moles of carbon, oxygen and silicon in the diamond like glass. In some embodiments, the amount of silicon is from 25 mole percent to 35 mole percent, based on the total moles of carbon, oxygen and silicon in the diamond like glass. In some embodiments, the amount of carbon is from 35 mole percent to 45 mole percent, based on the total moles of carbon, oxygen and silicon in the diamond like glass.

Figure 1B:
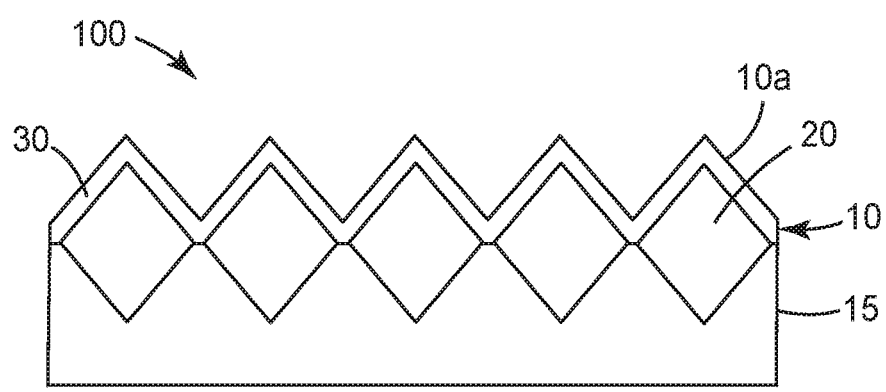
FIG. 1B is a schematic cross-sectional view of the exemplary abrasive article of FIG. 1A, through line 1B, according to one exemplary embodiment of the present disclosure.

FIG. 1A is a schematic top view of at least a portion of an exemplary abrasive article according to one exemplary embodiment of the present disclosure and FIG. 1B is a schematic cross-sectional view of the exemplary abrasive article of FIG. 1A, through line 1B, according to one exemplary embodiment of the present disclosure. FIGS. 1A and 1B show at least a portion of an abrasive article 100 including an abrasive layer 10. Abrasive layer 10 has a hydrophobic exterior surface 10a. Abrasive layer 10 includes and at least one of (i) a plurality of individual diamond particles and (ii) a plurality of engineered features having a conformable diamond layer. In this exemplary embodiment, abrasive layer 10 includes a plurality of individual diamond particles 20. Abrasive layer 10 further includes a conformable hydrophobic layer 30. Conformable hydrophobic layer 30 is in contact with and at least partially coats the plurality of individual diamond particles 20. Abrasive article 100 may further include first substrate 15. First substrate 15 may support abrasive layer 10. As shown in FIG. 1A, the at least a portion of an abrasive article 100 has a projected surface area equal to the area of the large circle which defines the perimeter of abrasive article 100.

The size of the diamond particles of the plurality of individual diamond particles may be selected to achieve the desired characteristics of the abrasive article depending on its intended application. In some embodiments, the diamond particles have an average particle size of from 5 to 1000 micrometers, from 2.0 to 1000 micrometers, from 40 to 1000 micrometers, from 5 to 600 micrometers, from 20 to 600 micrometers, from 40 to 600 micrometers, from 5 to 400 micrometers, from 20 to 400 micrometers, from 40 to 400 micrometers, from 5 to 200 micrometers, from 20 to 200 micrometers or even from 40 to 200 micrometers. Occasionally, diamond particles sizes are reported in terms of "mesh" or "grade," both of which are commonly known abrasive particle sizing methods. The plurality of individual diamond particles may have a narrow size distribution, with the percent non-uniformity of a distribution of particles being from 0 to 10 percent, 0 to 5 percent or even from 0 to 3 percent. The percent non-uniformity is the standard deviation of a size distribution of diamond particles divided by the average size of the diamond particle in the distribution multiplied by 100.

In some embodiments, the diamond particles of the plurality of individual diamond particles may include one or more coatings that may, for example, improve the adhesion of the diamond particles to the conformable hydrophobic layer. Any such coatings would be considered to be part of the diamond particles. In some embodiments, the diamond particles are free of one or more coatings, i.e. the diamond particles are free of a coating.

The areal density of the plurality of inorganic abrasive particles is not particularly limited. In some embodiments, the areal density of the plurality of inorganic abrasive particles may be from $0.5/cm^2$ to $1\times10^4/cm^2$, from $0.5/cm^2$ to $1\times10^3/cm^2$, from $0.5/cm^2$ to $1\times10^2/cm^2$, from $0.5/cm^2$ to $1\times10^1/cm^2$, from $1/cm^2$ to $1\times10^4/cm^2$, from $1/cm^2$ to $1\times10^3/cm^2$, from $1/cm^2$ to $1\times10^2/cm^2$, from $1/cm^2$ to $1\times10^1/cm^2$, from $10/cm^2$ to $1\times10^4/cm^2$, from $10/cm^2$ to $1\times10^3/cm^2$, from $10/cm^2$ to $1\times10^2/cm^2$, or even from $10/cm^2$ to $1\times10^1/cm^2$. The areal density of the inorganic abrasive particles may vary across the abrading surface of the abrasive article. The inorganic abrasive particles may be arranged randomly or may be arranged in a pattern, e.g. square grid array or hexagonal array, on the abrading surface.

Exemplary abrasive layers that include a plurality of individual diamond particles useful in the abrasive articles of the present disclosure, include diamond pad conditioners known in the art, including, but not limited to, diamond pad conditioners available under the trade designations 3M DIAMOND PAD CONDITONER and 3M 3M DIAMOND PAD CONDITONER RING available from the 3M Company, St. Paul, Minnesota. For example, 3M DIAMOND PAD CONDITONER A153L, 3M DIAMOND PAD CONDITONER A160 series (includes A160, A165, A165P, A166 and A168, for example), 3M DIAMOND PAD CONDITONER A180 series (includes A181, A188F, A188H, A188J, A188JH, A188K and A188L, for example), 3M DIAMOND PAD CONDITONER A270, 3M DIAMOND PAD CONDITONER A272, 3M DIAMOND PAD CONDITONER A2800 series (includes A2810, A2812, A2813 and A2850, for example), 3M DIAMOND PAD CONDITONER A3700, 3M DIAMOND PAD CONDITONER A3799, 3M DIAMOND PAD CONDITONER A4-55, 3M DIAMOND PAD CONDITONER A63, 3M DIAMOND PAD CONDITONER A82, 3M DIAMOND PAD CONDITONER A92, 3M DIAMOND PAD CONDITONER C123, 3M DIAMOND PAD CONDITONER H80-AL, 3M DIAMOND PAD CONDITONER H91, 3M DIAMOND PAD CONDITONER S122, 3M DIAMOND PAD CONDITONER S60, 3M DIAMOND PAD CONDITONER S82, 3M DIAMOND PAD CONDITONER S98, 3M DIAMOND PAD CONDITONER RING E187, 3M DIAMOND PAD CONDITONER RING E221, 3M DIAMOND PAD CONDITONER RING E3910, 3M DIAMOND PAD CONDITONER RING E3920 and 3M DIAMOND PAD CONDITONER RING E3921 may be used. These materials may further include a conformable hydrophobic layer in contact with and at least partially coating the plurality of individual diamond particles of the diamond pad conditioners, thereby forming an abrasive layer of the present disclosure.

Figure 1C:
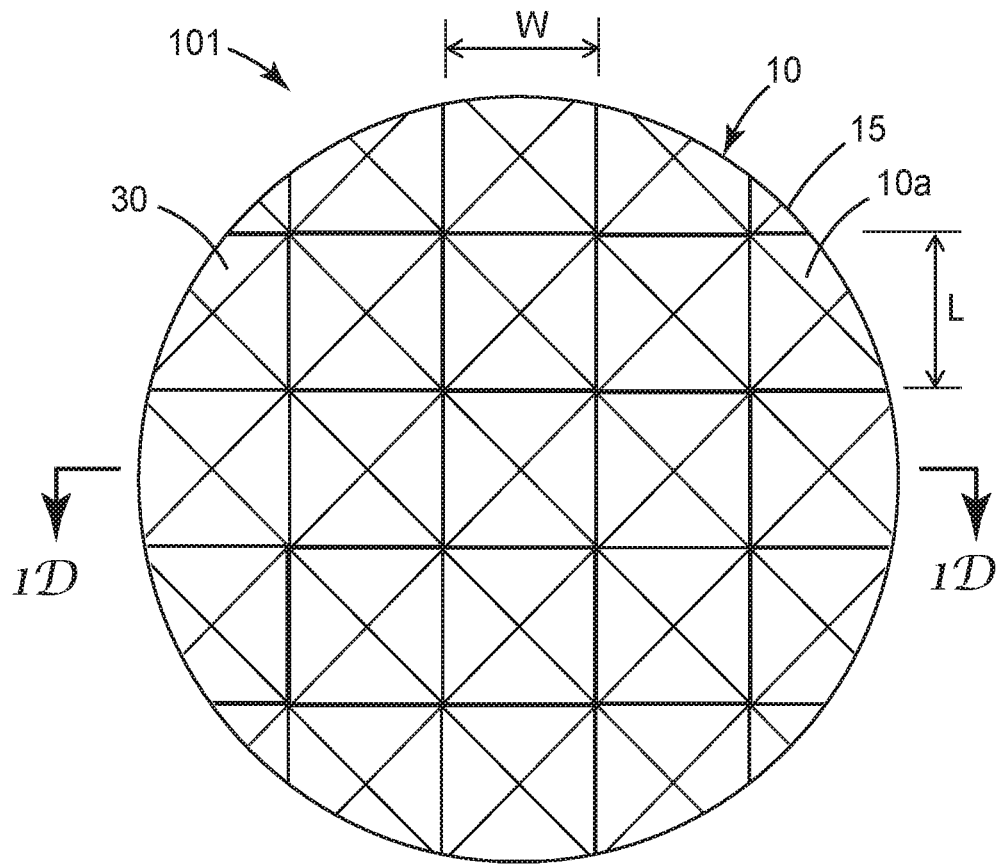
FIG. 1C is a schematic top view of at least a portion of an exemplary abrasive article according to one exemplary embodiment of the present disclosure.
Figure 1D:
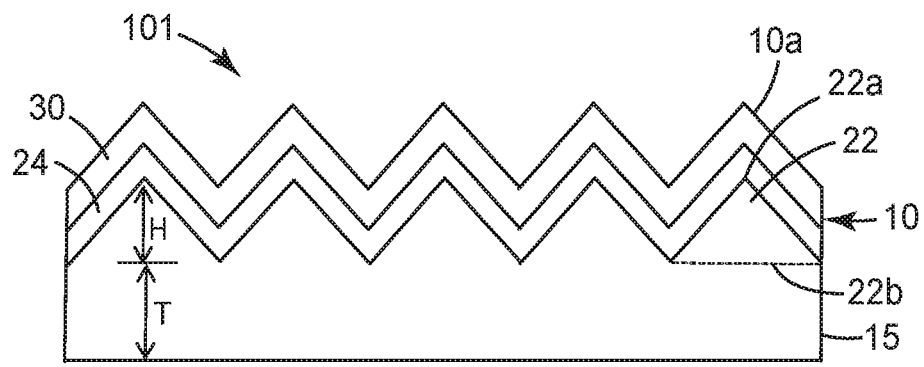
FIG. 1D is a schematic cross-sectional view of the exemplary abrasive article of FIG. 1C, through line 1D, according to one exemplary embodiment of the present disclosure.

FIG. 1C is a schematic top view of at least a portion of an exemplary abrasive article according to one exemplary embodiment of the present disclosure and FIG. 1D is a schematic cross-sectional view of the exemplary abrasive article of FIG. 1C, through line 1D, according to one exemplary embodiment of the present disclosure. FIGS. 1C and 1D show at least a portion of an abrasive article 101 including an abrasive layer 10. Abrasive layer 10 has a hydrophobic exterior surface 10a. Abrasive layer 10 includes at least one of (i) a plurality of individual diamond particles and (ii) a plurality of engineered features having a conformable diamond layer. In this exemplary embodiment, abrasive layer 10 includes a plurality of engineered features 22 having a conformable diamond layer 24. In this exemplary embodiment, the engineered features 22 have a four-sided pyramid shape, with the tips of the four-sided pyramids corresponding to the distal ends 22a of the plurality of engineered features and bases 22b. The three-dimensional features each have a length, L, a width, W, and a height, H. If the individual three-dimensional features have different lengths, widths and heights, average values of the length, width and height may be used to characterize the plurality of three-dimensional features. Abrasive layer 10 further includes a conformable hydrophobic layer 30. Conformable hydrophobic layer 30 is in contact with and at least partially coats the conformable diamond layer 24. Abrasive article 101 may further include first substrate 15. First substrate 15 may support abrasive layer 10. First substrate 15 may be integral with the plurality of engineered features 22, first substrate 15 and the plurality of engineered features 22 having the same composition, as shown in FIG. 1C, or may be a separate layer including a composition different from the composition of the plurality of engineered features 22. The thickness of the first substrate is T. As shown in FIG. 1C, the at least a portion of an abrasive article 101 has a projected surface area equal to the area of the large circle which defines the perimeter of abrasive article 101.

The abrasive articles of the present disclosure may include a plurality of engineered features. The engineered features may be defined as having a base and a distal end opposite the base. The areal density of the plurality of engineered features is not particularly limited. In some embodiments, the areal density of the plurality of engineered features may be from $0.5/cm^2$ to $1\times10^7/cm^2$, from $0.5/cm^2$ to $1\times10^6/cm^2$, from $0.5/cm^2$ to $1\times10^5/cm^2$, from $0.5/cm^2$ to $1\times10^4/cm^2$, from $0.5/cm^2$ to $1\times10^3/cm^2$, from $1/cm^2$ to $1\times10^7/cm^2$, from $1/cm^2$ to $1\times10^6/cm^2$, from $1/cm^2$ to $1\times10^5/cm^2$, from $1/cm^2$ to $1\times10^4/cm^2$, from $1/cm^2$ to $1\times10^3/cm^2$, from $10/cm^2$ to $1\times10^7/cm^2$, from $10/cm^2$ to $1\times10^6/cm^2$, from $10/cm^2$ to $1\times10^5/cm^2$, from $10/cm^2$ to $1\times10^4/cm^2$, or even from $10/cm^2$ to $1\times10^3/cm^2$. In some embodiments, at least one of the dimensions, e.g. length, width, height, diameter, of each of the individual engineered features may be from 1 micron to 2000 micron, from 1 micron to 1000 micron, from 1 micron to 750 micron, from 1 micron to 500 micron, from 10 micron to 2000 micron, from 10 micron to 1000 micron, from 10 micron to 750 micron, from 10 micron to 500 micron, from 25 micron to 2000 micron, from 25 micron to 1000 micron, from 25 micron to 750 micron, or even from 25 micron to 500 micron.

The plurality of engineered features and/or the first substrate may include a ceramic, i.e. the plurality of engineered features and/or the first substrate may be a ceramic having a continuous ceramic phase. The ceramic may be a sintered ceramic. The ceramic may contain less than 5 percent by weight, less than 3 percent by weight, less than 2 percent by weight, less than 1 percent by weight, less than 0.5 percent by weight or even 0 percent by weight polymer. The ceramic may contain less than 5 percent by weight, less than 3 percent by weight, less than 2 percent by weight, less than 1 percent by weight, less than 0.5 percent by weight or even 0 percent by weight organic material. The ceramic may be a monolithic ceramic. The ceramic is not particularly limited. The ceramic may include, but is not limited to, at least one of silicon carbide, silicon nitride, alumina, zirconia, tungsten carbide, and the like. Of these, silicon carbide and silicon nitride, and particularly silicon carbide can be advantageously used from the perspective of strength, hardness, wear resistance, and the like. In some embodiments, the ceramic is a carbide ceramic containing at least 70 percent, at least 80 percent, at least 90 percent, at least 95 percent or even at least 99 percent carbide ceramic by weight. Useful carbide ceramics include, but are not limited to, at least one of silicon carbide, boron carbide, zirconium carbide, titanium carbide and tungsten carbide. Combinations may be used. The ceramic may be fabricated without the use of carbide formers and may be substantially free of oxide sintering aides. In one embodiment, the ceramic includes less than about 1 percent oxide sintering aides by weight.

The plurality of engineered features can be formed by at least one of machining, micromachining, micro-replication, molding, extruding, injection molding, ceramic pressing, and the like, such that the plurality of engineered features are fabricated and are reproducible from part to part and within a part, reflecting the ability to replicate a design. The plurality of engineered features may be formed by machine techniques, including but not limited to, traditional machining, e.g. sawing, boring, drilling, turning and the like; laser cutting; water jet cutting and the like. The plurality of engineered features may be formed by micro-replication techniques, as known in the art. The plurality of engineered features may be formed directly in the first substrate or the first substrate and plurality of engineered features may be formed simultaneously during, for example, ceramic pressing or some other molding or embossing technique.

The shape of the plurality of engineered features is not particularly limited and may include, but is not limited to; circular cylindrical; elliptical cylindrical; polygonal prisms, e.g. pentagonal prism, hexagonal prism and octagonal prism; pyramidal and truncated pyramidal, wherein the pyramidal shape may include, for example, between 3 to 12 sidewalls; cuboidal, e.g. square cube or rectangular cuboid; conical and truncated conical; annular and the like. Combinations of two or more differing shapes may be used. The plurality of engineered features may be random or in a pattern, e.g. square array, hexagonal array and the like. Additional shapes and patterns of engineered features can be found in U.S. Pat. Appl. Publ. No. 2017/0008143 (Minami, et al.), which is incorporated herein by reference in its entirety.

When molding or embossing is used to form the plurality of engineered features, the mold or embossing tool has a predetermined array or pattern of at least one specified shape on the surface thereof, which is the inverse of the predetermined array or pattern and specified shape(s) of the engineered features of the ceramic body. The mold may be formed of metal, ceramic, cermet, composite or a polymeric material. In one embodiment, the mold is a polymeric material such as polypropylene. In another embodiment, the mold is nickel. A mold made of metal can be fabricated by engraving, micromachining or other mechanical means, such as diamond turning or by electroforming. One preferred method is electroforming. A mold can be formed by preparing a positive master, which has a predetermined array and specified shapes of the engineered features of the abrasive elements. The mold is then made having a surface topography being the inverse of the positive master. A positive master may be made by direct machining techniques, such as diamond turning, disclosed in U.S. Pat. No. 5,152,917 (Pieper, et al.) and U.S. Pat. No. 6,076,248 (Hoopman, et al.), the disclosures of which are herein incorporated by reference in their entireties. These techniques are further described in U.S. Pat. No. 6,021,559 (Smith), the disclosure of which is herein incorporated by reference in its entirety. A mold including, for example, a thermoplastic, can be made by replication off the metal master tool. A thermoplastic sheet material can be heated, optionally along with the metal master, such that the thermoplastic material is embossed with the surface pattern presented by the metal master by pressing the two surfaces together. The thermoplastic can also be extruded or cast onto the metal master and then pressed. Other suitable methods of fabricating production tooling and metal masters are discussed in U.S. Pat. No. 5,435,816 (Spurgeon et al.), which is herein incorporated by reference in its entirety.

The conformable diamond layer of the plurality of engineered features may include at least one of a conformable nano-crystalline diamond layer, conformable micro-crystalline diamond layer, and a conformable diamond like carbon (DLC) layer. The thickness of the conformable diamond layer is not particularly limited. In some embodiments the thickness of the diamond layer is from 0.5 microns to 30 microns, from 1 micron to 30 microns, from 5 microns to 30 microns, from 0.5 microns to 20 microns, from 1 micron to 20 microns, from 5 microns to 20 microns, from 0.5 microns to 15 microns, from 1 micron to 15 microns, or even from 5 microns to 15 microns. The conformable diamond layer may be a diamond-like carbon (DLC) layer, for example. DLC is amorphous, and includes a large amount of $sp^3$ carbon stabilized by hydrogen. For example, in some embodiments, the carbon atoms are present in an amount from 40 atomic percent to 95 atomic percent, from 40 atomic percent to 98 atomic from 40 atomic percent to 99 atomic percent, from 50 atomic percent to 95 atomic percent, from 50 atomic percent to 98 atomic from 50 atomic percent to 99 atomic percent, from 60 atomic percent to 95 atomic percent, from 60 atomic percent to 98 atomic, from 60 atomic percent to 99 atomic percent or even from 90 atomic percent to 99 atomic percent, based on the total composition of the DLC. The diamond layer can be deposited on a surface, e.g. the surface of the plurality of engineered features, by conventional technology such as a plasma enhanced chemical vapor deposition (PECVD) method, a hot wire chemical vapor deposition (HWCVD) method, ion beam, laser ablation, RF plasma, ultrasound, arc discharge, cathodic arc plasma deposition, and the like, using a gas carbon source such as methane or the like or a solid carbon source such as graphite or the like, and hydrogen as needed. In some embodiments, a diamond layer with high crystallinity can be produced by HWCVD.

In some embodiments, the conformable diamond layer may include one or more coatings that may, for example, improve the adhesion of the conformable diamond layer to the conformable hydrophobic layer. Any such coatings would be considered to be part of the conformable diamond layer. In some embodiments, the conformable diamond layer is free of one or more coatings, i.e. the conformable diamond layer is free of a coating.

The conformable hydrophobic layer of the present disclosure includes diamond like glass (DLG). The term "diamond-like glass" (DLG) refers to substantially or completely amorphous glass including carbon, silicon and oxygen, and optionally including one or more additional component selected from the group including hydrogen, nitrogen, fluorine, sulfur, titanium, and copper. Other elements may be present in certain embodiments. In some embodiments, the conformable hydrophobic layer is free of fluorine. In some embodiments, the DLG includes from 80 percent to 100 percent, from 90 percent to 100 percent, from 95 percent to 100 percent, from 98 percent to 100 percent or even from 99 percent to 100 percent carbon, silicon, oxygen and hydrogen, based on a mole basis of the DLG composition. In some embodiments, the DLG includes from 80 percent to 100 percent, from 90 percent to 100 percent, from 95 percent to 100 percent, from 98 percent to 100 percent or even from 99 percent to 100 percent carbon, silicon and oxygen, based on a mole basis of the DLG composition. In some embodiments, the amount of oxygen in the diamond like glass is from 25 mole percent to 35 mole percent, 30 to 35 mole percent or even from 32 to 35 mole percent, based on the total moles of carbon, oxygen and silicon in the diamond like glass. In some embodiments, the amount of silicon in the diamond like glass is from 25 mole percent to 35 mole percent, 29 to 35 mole percent or even from 32 to 35 mole percent, based on the total moles of carbon, oxygen and silicon in the diamond like glass. In some embodiments, the amount of carbon in the diamond like glass is from 35 mole percent to 45 mole percent, 37 to 45 mole percent or even from 42 to 45 mole percent, based on the total moles of carbon, oxygen and silicon in the diamond like glass.

Amorphous diamond-like glass of the present disclosure may contain clustering of atoms to give it a short-range order but are essentially void of medium and long range ordering that lead to micro or macro crystallinity which can adversely scatter radiation having wavelengths of from 180 nm to 800 nm. The term "amorphous" means a substantially randomly-ordered non-crystalline material having no x-ray diffraction peaks or modest x-ray diffraction peaks. When atomic clustering is present, it typically occurs over dimensions that are small compared to the wavelength of the actinic radiation. Useful diamond like glass and methods of making thereof can be found in, for example, U.S. Pat. No. 6,696,157 (David et al.), which is incorporated by reference in its entirety herein. The conformable hydrophobic layer, which includes diamond like glass, may be formed by conventional techniques, including, but not limited to, physical vapor deposition, chemical vapor deposition, plasma enhanced chemical vapor deposition and atomic layer deposition. The thickness of the conformable metal oxide coating is not particularly limited. In some embodiments, the thickness of the conformable hydrophobic layer is from 0.5 microns to 30 microns, from 1 micron to 30 microns, from 5 microns to 30 microns, from 0.5 microns to 20 microns, from 1 micron to 20 microns, from 5 microns to 20 microns, from 0.5 microns to 15 microns, from 1 micron to 15 microns, or even from 5 microns to 15 microns.

The diamond like glass forms a hydrophobic exterior surface. In some embodiments, the contact angle of the hydrophobic exterior surface is greater than 110 degrees, greater than 115 degrees, greater than 120 degrees, greater than 125 degree or even greater than 130 degrees. In some embodiments, the contact angle of the hydrophobic exterior surface is less than 180 degrees, less than 175 degrees, less than 170 degrees, less than 165 degrees or even less than 160 degrees. The contact angle can be measured by known techniques in the art. The contact angle may be measured by the Contact Angle Analysis Method described in the Example section of the present disclosure.

The conformable hydrophobic layer is in contact with and at least partially coats at least one of the plurality of individual diamond particles and the conformable diamond layer. In some embodiments, the conformable hydrophobic layer covers at least 40 percent, at least 60 percent, at least 80 percent, at least 90 percent, at least 95 percent or even at least 100 percent of the projected surface area of the abrasive article.

The abrasive article of the present disclosure may include a first substrate, e.g. a ceramic substrate, a metal substrate, e.g. a stainless steel substrate, or a polymeric substrate, e.g. a thermoset or thermoplastic. Various metal, ceramic and polymeric materials known in the art may be used for the first substrate, corrosion resistant metal, ceramic and polymeric substrates having particular utility. The abrasive article may include a bonding material useful for affixing the plurality of individual diamond particles to the first substrate. The diamond particles may be affixed to the first substrate of the abrasive article by materials known in the art including, but not limited to, at least one of a metal, a metal alloy and a thermoset adhesive. Known techniques in the art may be used to affix the diamond particles to the first substrate. Examples of useful first substrates, bonding material for affixing the diamond particles to the first substrate of the abrasive article and bonding techniques are disclosed in, for example, U.S. Pat. No. 6,123,612 (Gores), which is incorporated herein by reference in its entirety. The ceramic substrate may be a monolithic ceramic substrate. A monolithic ceramic substrate is a substrate that consists essentially of the ceramic it is composed of and has a continuous, ceramic structure throughout, e.g. a continuous, ceramic morphology throughout. In some embodiments, the plurality of engineered features and the first substrate are a monolithic ceramic. The ceramic morphology may be a single phase. A monolithic ceramic is generally designed to erode very slowly, preferably not at all, and contains no abrasive particles that may be release from the monolithic ceramic. The polymeric substrate may be a thermoset, e.g. phenolic resin, or a thermoplastic, e.g. polycarbonate, polyester, polysulphone. In some embodiments, the first substrate may be integral with the plurality of engineered features and/or the first substrate and the plurality of engineered features have the same composition. In some embodiments, the first substrate may be a separate layer from that of the plurality of engineered features and/or may include a composition different from the composition of the plurality of engineered features.

In another embodiment, the abrasive article of the present disclosure is fabricated as follows:

providing an abrasive layer having a surface, wherein the surface includes a plurality of individual diamond particles; and depositing a conformable hydrophobic layer in contact with and at least partially coating the plurality of individual diamond particles, thereby forming an abrasive layer having a hydrophobic exterior surface; and wherein the conformable hydrophobic layer includes diamond like glass and the contact angle of the hydrophobic exterior surface is greater than 110 degrees In yet another embodiment, the abrasive article of the present disclosure is fabricated as follows:

providing an abrasive layer having a surface, wherein the surface includes a plurality of engineered features having a conformable diamond layer; and depositing a conformable hydrophobic layer in contact with and at least partially coating the conformable diamond layer, thereby forming an abrasive layer having a hydrophobic exterior surface; and wherein the conformable hydrophobic layer includes diamond like glass and the contact angle of the hydrophobic exterior surface is greater than 110 degrees.

The abrasive articles of the present disclosure may find particular utility as a pad conditioner used in, for example, CMP applications. The abrasive articles may be useful for both full face pad conditioners and segmented pad conditioners. Segmented pad conditioners include at least one abrasive article of the present disclosure attached to a second substrate, the second substrate generally having a larger projected surface area than the abrasive article. Thus, there are regions on the segmented pad conditioner surface that contain the abrasive layer and regions that do not contain an abrasive layer. In some embodiments, a full face pad conditioner includes an abrasive article according to any one of the present disclosure. The surface area of the full face pad conditioner may include from 50 to 100 percent, from 60 to 100 percent, from 70 to 100 percent, from 80 to 100 percent or even from 90 to 100 percent abrading layer of an abrasive article according to the present disclosure.

Figure 2:
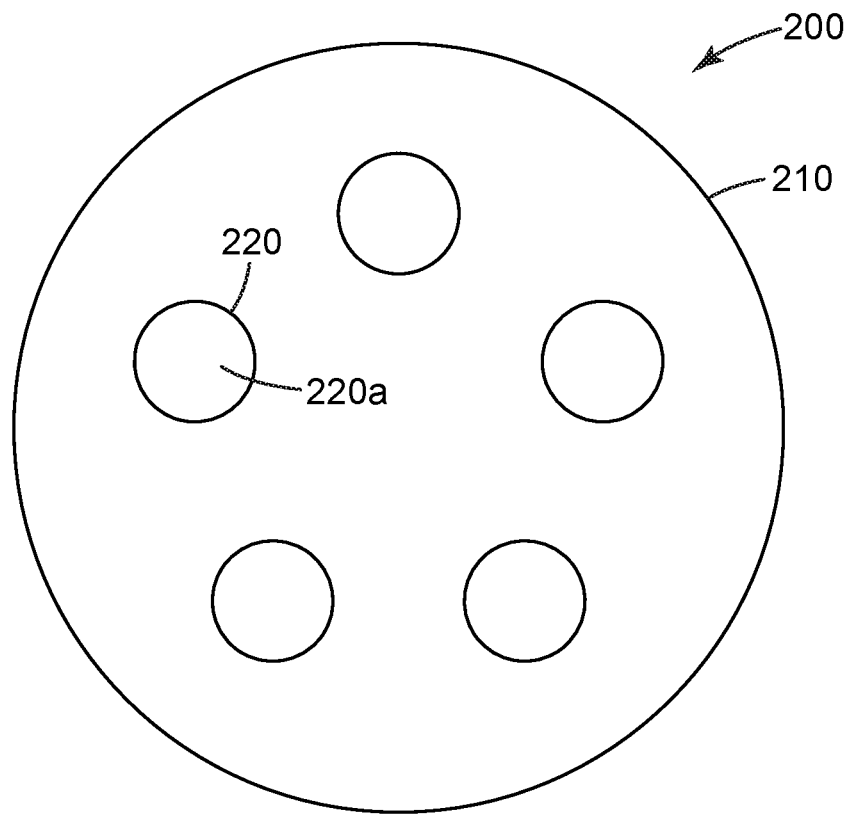
FIG. 2 is a schematic top view of a segmented pad conditioner according to one exemplary embodiment of the present disclosure.

A segmented pad conditioner includes a second substrate and at least one abrasive article according to any one of the abrasive articles of the present disclosure. The second substrate may include materials as those previously described for the first substrate. FIG. 2 shows a schematic top view of a segmented pad conditioner of the present disclosure. Segmented pad conditioner 200 includes a second substrate 210 and abrasive articles 220 having abrasive layer 220a. In this exemplary embodiment, segmented pad conditioner 200 includes five abrasive articles 220. Abrasive articles 220 may be any one of the abrasive articles of the present disclosure. Second substrate 210 is not particularly limited. Second substrate 210 may be a stiff material, for example, a metal. Second substrate 210 may be stainless steel, e.g. a stainless steel plate. In some embodiments, second substrate 210 has an elastic modulus of at least 1 GPa, at least 5 GPa or even at least 10 GPa. Abrasive articles 220 may be attached to substrate 210 by any means known in the art, e.g. mechanically (utilizing a screw or bolt) or an adhesive (utilizing an epoxy adhesive layer). It may be desirable to have the abrading layers 220a of abrasive articles 220 be substantially planar. Methods of mounting abrasive articles to a substrate enabling the planar abrading surfaces of the abrasive articles to be substantially planar are disclosed in U.S Pat. Publ. No. 2015/0224625 (LeHuu et al.), which is incorporate herein by reference in its entirety.

Figure 3:
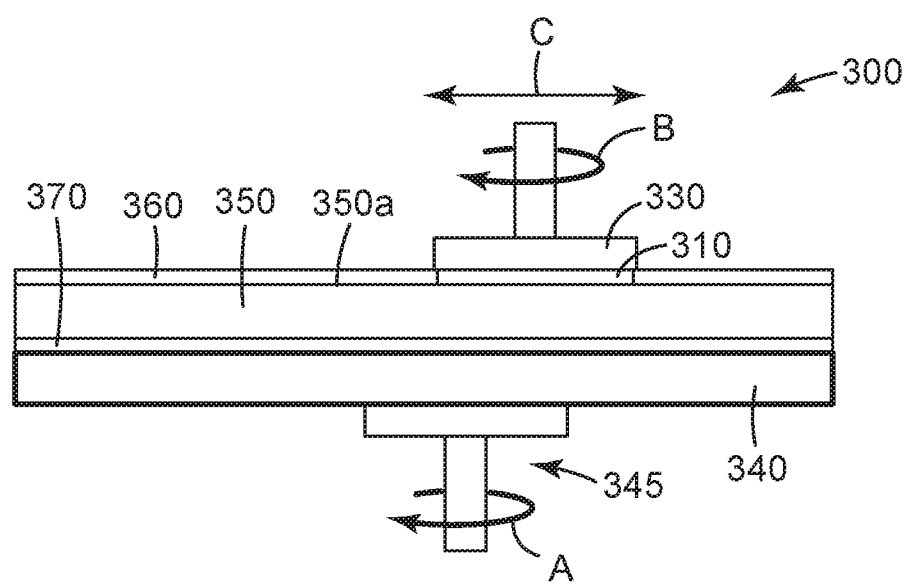
FIG. 3 is a schematic diagram of an exemplary polishing system for utilizing an abrasive article in accordance with some embodiments of the present disclosure.

FIG. 3 schematically illustrates an example of a polishing system 300 for utilizing abrasive articles in accordance with some embodiments of the present disclosure. As shown, polishing system 300 may include a polishing pad 350, having polishing surface 350a, and a pad conditioner 310 having an abrading layer. The pad conditioner includes at least one abrasive article according to any one of the abrasive articles of the present disclosure, wherein the abrasive layer of the pad conditioner includes the conformable hydrophobic layer of the at least one abrasive article. The system may further include one or more of the following: a working liquid 360, a platen 340 and a pad conditioner carrier assembly 330, a cleaning liquid (not shown). An adhesive layer 370 may be used to attach the polishing pad 350 to platen 340 and may be part of the polishing system. A substrate being polished (not shown) on polishing pad 350 may also be part of polishing system 300. Working liquid 360 may be a layer of solution disposed on polishing surface 350a of polishing pad 350. Polishing pad 350 may be any polishing pad known in the art. Polishing pad 350 includes a material, i.e. it is fabricated from a material. The material of the polishing pad may include a polymer, e.g. at least one of a thermoset polymer and a thermoplastic polymer. The thermoset polymer and the thermoplastic polymer may be a polyurethane, i.e. the material of the polishing pad may be a polyurethane. The working liquid is typically disposed on the surface of the polishing pad. The working liquid may also be at the interface between pad conditioner 310 and polishing pad 350. During operation of polishing system 300, a drive assembly 345 may rotate (arrow A) the platen 340 to move the polishing pad 350 to carry out a polishing operation. The polishing pad 350 and the polishing solution 360 may separately, or in combination, define a polishing environment that mechanically and/or chemically removes material from or polishes a major surface of a substrate to be polished. To abrade, i.e. condition, polishing surface 350a with pad conditioner 310, the carrier assembly 330 may urge pad conditioner 310 against polishing surface 350a of polishing pad 350 in the presence of polishing solution 360. The platen 340 (and thus the polishing pad 350) and/or the pad conditioner carrier assembly 330 then move relative to one another to translate pad conditioner 310 across polishing surface 350a of polishing pad 350. The carrier assembly 330 may rotate (arrow B) and optionally transverse laterally (arrow C). As a result, the abrasive layer of pad conditioner 310 removes material from polishing surface 350a of polishing pad 350. It is to be appreciated that the polishing system 300 of FIG. 3 is only one example of a polishing system that may be employed in connection with the abrasive articles of the present disclosure, and that other conventional polishing systems may be employed without deviating from the scope of the present disclosure.

Select embodiments of the present disclosure include, but are not limited to, the following:

In a first embodiment, the present disclosure provides an abrasive article comprising: an abrasive layer, having a hydrophobic exterior surface, including at least one of (i) a plurality of individual diamond particles and (ii) a plurality of engineered features having a conformable diamond layer and; a conformable hydrophobic layer in contact with and at least partially coating at least one of the plurality of individual diamond particles and the conformable diamond layer and, wherein the conformable hydrophobic layer includes diamond like glass and forms the hydrophobic exterior surface and the contact angle of the hydrophobic exterior surface is greater than 110 degrees, optionally, the contact angle of the hydrophobic exterior surface may be greater than 120 degrees, 125 degrees or 130 degrees.

In a second embodiment, the present disclosure provides and abrasive article according to the first embodiment, wherein the conformable diamond layer includes at least one of diamond like carbon, microcrystalline diamond and nanocrystalline diamond.

In a third embodiment, the present disclosure provides and abrasive article according to the first or second embodiments, wherein the diamond like glass includes carbon, oxygen and silicon.

In a fourth embodiment, the present disclosure provides and abrasive article according to the third embodiment, wherein the amount of oxygen is from 25 mole percent to 35 mole percent, based on the total moles of carbon, oxygen and silicon in the diamond like glass.

In a fifth embodiment, the present disclosure provides and abrasive article according to the third or fourth embodiments, wherein the amount of oxygen is from 30 mole percent to 35 mole percent, based on the total moles of carbon, oxygen and silicon in the diamond like glass.

In a sixth embodiment, the present disclosure provides and abrasive article according to any one of the third through fifth embodiments, wherein the amount of silicon is from 25 mole percent to 35 mole percent, based on the total moles of carbon, oxygen and silicon in the diamond like glass.

In a seventh embodiment, the present disclosure provides and abrasive article according to any one of the third through sixth embodiments, wherein the amount of carbon is from 35 mole percent to 45 mole percent, based on the total moles of carbon, oxygen and silicon in the diamond like glass.

In an eighth embodiment, the present disclosure provides and abrasive article according to any one of the first through seventh embodiments, wherein the plurality of individual diamond particles has an average particle size from 5 microns to 400 microns.

In a ninth embodiment, the present disclosure provides and abrasive article according to any one of the first through seventh embodiments, wherein the abrasive layer having a hydrophobic exterior surface includes a plurality of engineered features having a conformable diamond layer.

In a tenth embodiment, the present disclosure provides and abrasive article according to any one of the first through ninth embodiments, wherein the abrasive layer having a hydrophobic exterior surface includes a plurality of individual diamond particles.

In an eleventh embodiment, the present disclosure provides and abrasive article according to any one of the first through tenth embodiments, wherein the contact angle of the hydrophobic exterior surface is less than 180 degrees, optionally less than 175 degrees, less than 170 degrees or less than 165 degrees.

In a twelfth embodiment, the present disclosure provides a method of making an abrasive article comprising:
 providing an abrasive layer having a surface, wherein the surface includes a plurality of engineered features having a conformable diamond layer; and
 depositing a conformable hydrophobic layer in contact with and at least partially coating the conformable diamond layer, thereby forming an abrasive layer having a hydrophobic exterior surface; and
wherein the conformable hydrophobic layer includes diamond like glass and the contact angle of the hydrophobic exterior surface is greater than 120 degrees.

In a thirteenth embodiment, the present disclosure provides a method of making an abrasive article according to the twelfth embodiment, wherein the conformable diamond layer includes at least one of diamond like carbon, microcrystalline diamond and nanocrystalline diamond.

In a fourteenth embodiment, the present disclosure provides a method of making an abrasive article according to the twelfth or thirteenth embodiments, wherein the diamond like glass includes carbon, oxygen and silicon.

In a fifteenth embodiment, the present disclosure provides a method of making an abrasive article according to the fourteenth embodiment, wherein the amount of oxygen is from 25 mole percent to 35 mole percent, based on the total moles of carbon, oxygen and silicon in the diamond like glass.

In a sixteenth embodiment, the present disclosure provides a method of making an abrasive article according to the fourteenth or fifteenth embodiments, wherein the amount of silicon is from 25 mole percent to 35 mole percent, based on the total moles of carbon, oxygen and silicon in the diamond like glass.

In a seventeenth embodiment, the present disclosure provides a method of making an abrasive article according to any one of the fourteenth through sixteenth embodiments, wherein the amount of carbon is from 35 mole percent to 45 mole percent, based on the total moles of carbon, oxygen and silicon in the diamond like glass.

In an eighteenth embodiment, the present disclosure provides a method of making an abrasive article comprising:
 providing an abrasive layer having a surface, wherein the surface includes a plurality of individual diamond particles; and
 depositing a conformable hydrophobic layer in contact with and at least partially coating the plurality of individual diamond particles, thereby forming an abrasive layer having a hydrophobic exterior surface; and
wherein the conformable hydrophobic layer includes diamond like glass and the contact angle of the hydrophobic exterior surface is greater than 110 degrees.

In a nineteenth embodiment, the present disclosure provides a method of making an abrasive article according to the eighteenth embodiment, wherein the conformable diamond layer includes at least one of diamond like carbon, microcrystalline diamond and nanocrystalline diamond.

In a twentieth embodiment, the present disclosure provides a method of making an abrasive article according to the eighteenth or nineteenth embodiments, wherein the diamond like glass includes carbon, oxygen and silicon.

In a twenty-first embodiment, the present disclosure provides a method of making an abrasive article according to the twentieth embodiment, wherein the amount of oxygen is from 25 mole percent to 35 mole percent, based on the total moles of carbon, oxygen and silicon in the diamond like glass.

In a twenty-second embodiment, the present disclosure provides a method of making an abrasive article according to the twentieth or twenty-first embodiments, wherein the amount of silicon is from 25 mole percent to 35 mole percent, based on the total moles of carbon, oxygen and silicon in the diamond like glass.

In a twenty-third embodiment, the present disclosure provides a method of making an abrasive article according to any one of the twentieth through twenty-second embodiments, wherein the amount of carbon is from 35 mole percent to 45 mole percent, based on the total moles of carbon, oxygen and silicon in the diamond like glass.

In a twenty-fourth embodiment, the present disclosure provides a method of making an abrasive article according to any one of the eighteenth through twenty-third embodiments, wherein the plurality of individual diamond particles has an average particle size from 5 microns to 400 microns.

In a twenty-fifth embodiment, the present disclosure provides a method of making an abrasive article according to any one of the eighteenth through twenty-fourth embodiments, wherein the contact angle of the hydrophobic exterior surface is greater than 120 degrees.

In a twenty-sixth embodiment, the present disclosure provides a polishing system comprising:
a polishing pad including a material;
a pad conditioner having an abrasive layer, wherein the pad conditioner includes at least one abrasive article according to any one of the first through eleventh embodiments.

EXAMPLES

MATERIALS

| Abbreviation or Trade Name | Description |
| --- | --- |
| HMDSO | Hexamethyldisiloxane, ≥98%, available as HMDSO from Sigma-Aldrich, St. Louis, MO. |
| TMS | Tetramethyl silane ≥99%, available as TMS from Sigma-Aldrich, St. Louis, MO. |
| A2813 | A diamond abrasive particle pad conditioner, available under the trade designation 3M DIAMOND PAD CONDITIONER A2813, 4.25 inch Diameter, from 3M Company, St. Paul, MN |
| B5 | A pad conditioner with five ceramic abrasive elements, available under the trade designation 3M TRIZACT PAD CONDITIONER B5-M990, 4.25 inch Diameter, from 3M Company, St. Paul, MN. |

Fabrication Techniques
Diamond-Like Glass (DLG) Plasma Deposition Method:

Diamond-like glass plasma deposition was conducted by placing a pad conditioner (A2813), which a plurality of inorganic abrasive particles on its abrading surface, in a plasma chamber. Air was evacuated from the chamber by a mechanical pump and the chamber reached a base pressure lower than 100 mTorr, before igniting the plasma. Three steps were used to deposit the diamond-like glass layer on the surface of the pad conditioner. First, the sample was cleaned by using oxygen gas, 50 sccm flow rate, with plasma at 300 W for 30 sec. Next, deposition of the diamond-like glass was conducted by exposing the surface of a pad conditioner to a mixture of either HMDSO/O2 or TMS/O2 at rf power 100-500 W at 13.56 MHz. The plasma results in the deposition of an a-C:H:Si:O surface of DLG. See Table 1 for specific gases used and gas ratios.

TABLE 1

| DLG Deposition Process | Reaction gas | | | Power (W) | Reaction time |
| --- | --- | --- | --- | --- | --- |
| | O2 (sccm) | HMDSO (sccm) | TMS (sccm) | | |
| CD1 | 25 | 50 | | 200 | 30 sec |
| CD2 | | 50 | | 200 | 30 sec |
| CD3 | 25 | | 100 | 300 | 30 sec |
| CD4 | | | 25 | 200 | 30 sec |
| CD5 | 10 | 50 | | 200 | 30 sec |
| CD6 | 35 | 50 | | 200 | 30 sec |
| CD7 | 50 | 50 | | 200 | 30 sec |
| CD8 | 70 | 50 | | 200 | 30 sec |
| CD9 | 100 | 50 | | 200 | 30 sec |
| CD10 | 35 | 70 | | 300 | 30 sec |

Testing Methods
Conditioning Test Method:

Conditioning was conducted using a CETR-CP4 (available form Bruker Company) having a. 9 inch (23 cm) diameter platen. A 9 inch (23 cm) diameter IC1000 pad (available from Dow Chemical) was mounted on the platen and an Example pad conditioner or Comparative Example pad conditioner was mounted on the rotating spindle of the CETR-CP4. Conditioning was conducted at a platen speed of 93 rpm and a spindle speed of 87 rpm, respectively. The downforce on the conditioner was 6 lbs (27 N) and the IC1000 pad was abraded by the pad conditioner. During the conditioning, de-ionized water flows to platen at a flow rate of 100 mL/min.

Contact Angle Analysis Method:

The coated substrate samples prepared as described in the following Examples and Comparative Examples were cleaned by compress air to eliminate impurity particles before measuring water ($H_2O$) contact angles (using water as the wetting liquid). Static water contact angle measurements were made using deionized water filtered through a filtration system on a drop shape analyzer (available as product number DSA 100 from Kruss, Hamburg, Germany). Reported values were the averages of measurements of two drops measured on the element. Drop volumes were 3 microliters.

Examples 2-5 and Comparative Example 1

Examples 2-5 were prepared using a diamond particle pad conditioner, A2813, following the Diamond-like Glass (DLG) Plasma Deposition Method described above. Comparative Example 1 (CE-1) was an A2813 pad conditioner, used as received. The specific DLG coating conditions are shown in Table 2, below. Examples 2-5 and CE-1 were tested using the Conditioning Test Method described above. The specific conditioning time is shown in Table 2. After conditioning, the surface of the pad conditioner was analyzed using the Contact Angle Analysis Method described above. Results are shown in Table 2.

TABLE 2

| Example | DLG Deposition Process | Contact angle (before Conditioning Test) | Conditioning Time (hours) | Contact angle (after Conditioning Test) |
|---|---|---|---|---|
| CE-1 | N/A | 93° | NA | NA |
| 2 | CD1 | 129° | 4 | 130° |
| 3 | CD2 | 126° | 1 | 125° |
| 4 | CD3 | 126° | 1 | 97° |
| 5 | CD4 | 113° | 1 | 108° |

Examples 6-10 and Comparative Example 1

Examples 6-10 were prepared using a diamond particle pad conditioner, A2813, following the Diamond-like Glass (DLG) Plasma Deposition Method described above. Comparative Example 1 (CE-1) was an A2813 pad conditioner, used as received. The specific DLG coating conditions are shown in Table 3, below. Examples 6-10 and CE-1 were analyzed using the Contact Angle Analysis Method described above. Results are shown in Table 3.

TABLE 3

| Example | DLG Deposition Process | Contact angle (before Conditioning Test) |
|---|---|---|
| CE-1 | N/A | 93° |
| 6 | CD5 | 130° |
| 7 | CD6 | 135° |
| 8 | CD7 | 130° |
| 9 | CD8 | 120° |
| 10 | CD9 | 108° |

Examples 12 and Comparative Example 11

Example 12 were prepared using B5 pad conditioner following the Diamond-like Glass (DLG) Plasma Deposition Method described above. Comparative Example 11 (CE-11) was a B5 pad conditioner, used as received. Example 12 and CE-11 were analyzed using the Contact Angle Analysis Method described above. Results are shown in Table 4.

TABLE 4

| Example | DLG Deposition Process | Contact angle (before Conditioning Test) | Conditioning Duration (hours) | Contact angle (after Conditioning Test) |
|---|---|---|---|---|
| CE-11 | N/A | 98° | NA | NA |
| 12 | CD10 | 119° | 1 | 115° |

What is claimed is:

1. An abrasive article comprising:
an abrasive layer, having a hydrophobic exterior surface, including a plurality of engineered features having a conformable diamond layer and; a conformable hydrophobic layer in contact with and at least partially coating the conformable diamond layer and, wherein the conformable hydrophobic layer is free of fluorine, includes diamond like glass and forms the hydrophobic exterior surface and the contact angle of the hydrophobic exterior surface is greater than 120 degrees.

2. The abrasive article of claim 1, wherein the conformable diamond layer includes at least one of diamond like carbon, microcrystalline diamond and nanocrystalline diamond.

3. The abrasive article of claim 1, wherein the diamond like glass includes carbon, oxygen and silicon.

4. The abrasive article of claim 3, wherein the amount of oxygen is from 25 mole percent to 35 mole percent, based on the total moles of carbon, oxygen and silicon in the diamond like glass.

5. The abrasive article of claim 3, wherein the amount of oxygen is from 30 mole percent to 35 mole percent, based on the total moles of carbon, oxygen and silicon in the diamond like glass.

6. The abrasive article of claim 3, wherein the amount of silicon is from 25 mole percent to 35 mole percent, based on the total moles of carbon, oxygen and silicon in the diamond like glass.

7. The abrasive article of claim 3, wherein the amount of carbon is from 35 mole percent to 45 mole percent, based on the total moles of carbon, oxygen and silicon in the diamond like glass.

8. The abrasive article of claim 1, wherein the contact angle of the hydrophobic exterior surface is greater than 130 degrees.

9. A method of making an abrasive article comprising:
providing an abrasive layer having a surface, wherein the surface includes a plurality of engineered features having a conformable diamond layer; and
depositing a conformable hydrophobic layer in contact with and at least partially coating the conformable diamond layer, thereby forming an abrasive layer having a hydrophobic exterior surface; and
wherein the conformable hydrophobic layer is free of fluorine, includes diamond like glass and the contact angle of the hydrophobic exterior surface is greater than 120 degrees.

10. The method of making an abrasive article of claim 9, wherein the diamond like glass includes carbon, oxygen and silicon.

11. The method of making an abrasive article of claim 10, wherein the amount of oxygen is from 25 mole percent to 35 mole percent, based on the total moles of carbon, oxygen and silicon in the diamond like glass.

12. The method of making an abrasive article of claim 10, wherein the amount of silicon is from 25 mole percent to 35 mole percent, based on the total moles of carbon, oxygen and silicon in the diamond like glass.

13. The method of making an abrasive article of claim 10, wherein the amount of carbon is from 35 mole percent to 45 mole percent, based on the total moles of carbon, oxygen and silicon in the diamond like glass.

* * * * *